(12) United States Patent
Yamakawa et al.

(10) Patent No.: US 6,357,015 B1
(45) Date of Patent: Mar. 12, 2002

(54) DATA INTERFACE AND HIGH-SPEED COMMUNICATION SYSTEM USING THE SAME

(75) Inventors: Shigeki Yamakawa; Hiroshi Gokan; Akio Ohtsuji, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/331,773

(22) PCT Filed: Oct. 27, 1997

(86) PCT No.: PCT/JP97/03898

§ 371 Date: Jun. 24, 1999

§ 102(e) Date: Jun. 24, 1999

(87) PCT Pub. No.: WO99/22307

PCT Pub. Date: May 6, 1999

(51) Int. Cl.[7] .................................................. G06F 1/04
(52) U.S. Cl. ...................................................... 713/600
(58) Field of Search ................................ 713/400, 500, 713/600

(56) References Cited

U.S. PATENT DOCUMENTS

| 4,222,103 A | * | 9/1980 | Chamberlin ................. 713/600 |
| 4,423,482 A | * | 12/1983 | Hargrove et al. ........... 713/600 |
| 4,812,973 A | | 3/1989 | Kinoshita |
| 5,371,877 A | | 12/1994 | Drako et al. |
| 5,930,502 A | * | 7/1999 | Picco et al. ................. 713/501 |
| 6,081,877 A | * | 6/2000 | Taki ............................ 711/167 |

FOREIGN PATENT DOCUMENTS

| EP | 729106 | 8/1996 |
| JP | 191959 | 6/1989 |
| JP | 573510 | 3/1993 |

* cited by examiner

Primary Examiner—Dennis M. Butler
(74) Attorney, Agent, or Firm—Leydig, Voit & Mayer, Ltd.

(57) ABSTRACT

A data interface for communicating data between processors having: a writing-side register group in which data in a writing-side processor which transmits data is written in response to a clock signal; a reading-side register group into which the data written into the writing-side register group is transferred and written in response to a later clock operation, the data being read out by a reading-side processor of a data receiving side; a write controller for selectively writing data in a register in the writing-side register group in accordance with an address signal and a write signal of the writing-side processor; and a read controller for selectively reading data from a register in the reading-side register group in accordance with an address signal of the reading-side processor; so that a double buffer structure consisting of the writing-side buffers and the reading-side buffers causes the address signal and the data signal to individually be connected in the writing side and the reading side. Thus, the respective processors are able to transfer data without mutual interference.

11 Claims, 6 Drawing Sheets

DATA INTERFACE AND HIGH-SPEED COMMUNICATION SYSTEM USING THE SAME

TECHNICAL FIELD

The present invention relates to a data interface for communicating data between processors and a high-speed-communication system using the interface.

BACKGROUND ART

The present invention relates to an interface which is capable of, at high speed, communicating (transmitting and receiving) data between microprocessors when, for example, a mechanical structure, e.g., an electric motor, which must be controlled, is controlled by a processing system having a multiprocessor structure with a plurality of microprocessors, and to a high-speed-communication system using the interface.

Hitherto, when control is performed by a plurality of microprocessors, a method using serial transmission or parallel transmission or transmission using a dual port memory has been employed, in which commands, messages and various control information items are communicated between a microprocessor (hereinafter called a "control-side processor") for receiving from an object to be controlled information indicating the state of the object, performing a calculation from the received control information, and directly issuing a command to the object to be controlled and a microprocessor (hereinafter called a "central processor") for issuing a command to a sole processor or a plurality of control-side processors in accordance with information obtained from a transmission interface, man-machine interface or an external interface. The transmission using the dual port memory is performed in such a manner that read/write from the control side, the central side or both sides to and from the dual port memory is performed in accordance with a transfer procedure previously determined between the control side and the central side to communicate commands, messages and various control information items.

When various control information items are communicated among one central processor and a plurality of control-side processors, the following conditions must be satisfied:

(1) Although the timing at which information is transmitted from the central processor to each of the control-side processor is relatively long compared to the short time high-speed operation cycle of the high-speed sampling performed in each of the control-side processors, data communication must be reliably performed during the transmission timing;

(2) Since the data which must be communicated between the central processor and each of the control-side processors can have tens to hundreds of word units, the circuit function must be larger than the volume of data which can be transmitted in one transmission operation;

(3) Considering the short-time high-speed operation cycle of high-speed sampling performed by each of the control-side processors, the central processor is inhibited from performing a process which affects the operation time of each of the control-side processors and which is longer than the operation period (cycle) for each of the control-side processors. Also, when the central processor transmits information to and receives information from each of the control-side processors, the central processor must not perform a process which affects its processing time and which is longer than its operation cycle;

(4) Since control information data which is communicated between the central processor and the control-side processor in a single operation is in the form of a block having conformability or unity, an occurrence in which a success in communication of certain data items and a failure in communication of certain data items in the same block must be inhibited.

To satisfy the above-mentioned conditions, a method of realizing a operation architecture and a circuit between the single central processor and a plurality of control-side processors has been as follows.

In conventional serial transmission, synchronous or asynchronous transfer can be selected. If one word has a volume of one byte and information about one word is communicated, two processors attempting to communicate are able to conduct the communication without mutual interference. However, if the quantity of data, which must be communicated, is larger than the above-mentioned quantity, the receiver side must inform the transmission-side processor of receipt of data to permit the transmission-side processor to transfer next data. As a result, two processors having different operation cycles must perform a handshake operation to send the confirmation information "completion of transmission/incompletion of transmission" and "completion of receipt/incompletion of receipt" between the central processor and the control-side processor which have communicated with each other. To perform the process for confirming communication completion of control information data, both transmission and receipt-side processors undesirably interfere in the other's operation processing periods with each other. Thus, the processing time is excessively elongated.

It might be considered feasible to arrange the conventional serial transmission in such a manner that a large buffer for storing data in a quantity of tens to hundreds of words is provided as a received-data storage buffer of an interface circuit block so that a receipt completion flag is set when a predetermined number of data has been received to enable the receiving-side processor to determine whether start of the data receiving operation is permitted. Even so, since the timing at which the control-side processor or the central processor reads data from the buffer of the serial interface and the timing at which the serial interface supplies data to the buffer coincide with each other, there is the great possibility that the processor with a longer operation period fails to receive data. Thus, data cannot be reliably received with predetermined sampling and the reliability in receiving data deteriorates.

To prevent this, a dedicated high-speed-communication processor must be provided for each of the two communication terminals to exclusively perform error processing and the like. In this case, a communication processor is employed, resulting in that a problem arises which is the same as that experienced with the communication between the central processor and the control-side processor to determine a procedure for transferring data of control information between the communication processor and the central processor or the control-side processor without affecting the mutual operation processes of the processors.

The parallel transmission must be performed in such a manner that control information data is communicated at a transfer timing synchronous between the two sides. If either side performs another process during the process for communicating control information data attributable to interruption or the like, data transfer cannot be performed. In this case, either of the two sides always performs the interruption process for another and thus the mutual operation processing periods (cycles) are allowed to interfere with each other, thus causing the processing time to be excessively elongated.

In a transmission using a dual port memory, access can be inhibited by a BUSY terminal or the like to inhibit access for either side when the other side is making an access. Thus, the two sides are able to individually perform operations without the necessity of establishing synchronization. However, a central processor having a long operation processing period fails to write control information data on the dual port memory (that is, transmit data) when each of the control-side processors with short operation processing periods are reading data in the dual port memory in advance. Although data can again be transmitted after the failure, in the communication of the control information with keeping a conformability or unity of the sequential data items which are transmitted in one transmission operation, it is not possible to provide the control-side processor with the time inhibiting reading of the dual port memory, by means of the circuit structure of only the dual port memory. Moreover, the operation for again transmitting data from the central processor results in the operation processing time for the central processor being excessively elongated.

In Japanese Utility Model Unexamined Publication No. 1-91959, an arrangement has been disclosed in which two buffers for writing and reading are provided to transfer data between the two buffers after a predetermined time has elapsed from receipt of a writing signal or a reading signal. However, if the operation speeds of the operating apparatuses for performing the communication are different from each other or if the data communication frequencies are different from each other, reliable data transmission between the buffers cannot be performed sometimes.

SUMMARY OF THE INVENTION

To solve the above-mentioned problems, an object of the present invention is to provide a data interface for communicating (transmitting and receiving) control information data between processors in such a manner that interference with the mutual calculation processing operation/time is prevented, as well as to provide a high-speed communication system using the data interface.

Another object of the present invention is to obtain a data interface which enables data transmission to be performed in such a manner that control information data, which is communicated between processors in one operation, is formed into a block and conformability or unity (compatibility) of data items is maintained, and a high-speed-communication system using the foregoing data interface.

In view of the foregoing, according to the present invention, there is provided a data interface for communicating data between processors, comprising: a writing-side register group on which data in a writing-side processor of a data transmitting side is written in response to a clock signal; a reading-side register group into which the data written into the writing-side register group is transferred and written in response to a later clock operation, the data being read out by a reading-side processor of a data receiving side; write control means for selectively writing data on a register in the writing-side register group in accordance with an address signal and a write signal of the writing-side processor; and read control means for selectively reading data from a register in the reading-side register group in accordance with an address signal of the reading-side processor.

According to the another aspect of the present invention, there is provided a data interface having a structure where the write control means includes: a register writing select-signal generating circuit for generating a writing select signal for selectively writing data on the register in the writing-side register group in accordance with the address signal and the write signal of the writing-side processor, and a writing-side selector circuit provided for each register in the writing-side register group and arranged to normally select data obtained by feeding back data in the corresponding register in the reading-side register group and to select data in the writing-side processor to supply data to the register in the writing-side register group when selected in response to the writing select signal, and the read control means includes; a register reading select-signal generating circuit for generating a reading select signal for selectively reading the register in the reading-side register group in accordance with the address signal of the reading-side processor, and a reading-side selector circuit connected to each register in the reading-side register group and arranged to output, to the reading-side processor, data in the register in the reading-side register group selected in accordance with the reading select signal.

According to the another aspect of the present invention, there is provided a data interface having a structure where the write control means inhibits data transfer from the writing-side register group to the reading-side register group during a period in which the reading-side processor is reading data and causes data to automatically be transferred after reading has been completed.

According to the another aspect of the present invention, there is provided a data interface having a structure where the write control means includes: a register writing select-signal generating circuit for generating a writing select signal for selectively writing data on the register in the writing-side register group in accordance with the address signal and the write signal of the writing-side processor, a writing-side selector circuit provided for each register in the writing-side register group and arranged to normally select data obtained by feeding back data in the register in the writing-side register group and to select data in the writing-side processor to supply data to the register in the writing-side register group when selected in response to the writing select signal, and a second writing-side selector circuit provided for each register in the reading-side register group and arranged to normally select data in the corresponding register in the writing-side register group and to select data obtained by feeding back data in the register in the reading-side register group to supply data to the register in the reading-side register group when the read signal of the reading-side processor is in a read state, and the read control means includes; a register reading select-signal generating circuit for generating a reading select signal for selectively reading the register in the reading-side register group in accordance with the address of the reading-side processor, and a reading-side selector circuit connected to each register in the reading-side register group and arranged to output, to the reading-side processor, data in the register in the reading-side register group selected in accordance with the reading select signal.

According to the another aspect of the present invention, there is provided a data interface having a structure where the write control means inhibits data transfer from the writing-side register group to the reading-side register group during a period in which the writing-side processor performs writing and causes data to be collectively transferred to the reading-side register group when writing on a specific address has been performed.

According to the another aspect of the present invention, there is provided a data interface having a structure where the write control means includes: a register writing select-signal generating circuit for generating a writing select signal for selectively writing data on the register in the writing-side register group in accordance with the address signal and the write signal of the writing-side processor, a writing-side selector circuit provided for each register in the writing-side register group and arranged to normally select data obtained by feeding back data in the register in the writing-side register group and to select data in the writing-side processor to supply data to the register in the writing-side register group when selected in response to the writing select signal, a write-completion-signal generating circuit for generating a write completion signal for causing data to be collectively transferred from the writing-side register group to the reading-side register when writing on a predetermined address has been performed in accordance with the address signal and the write signal of the writing-side processor, and a second writing-side selector circuit provided for each register in the reading-side register group and arranged to normally select data obtained by feeding back data in the register in the reading-side register group and to select data in the corresponding register in the writing-side register group to supply data to the register in the reading-side register group when the write completion signal indicates completion of writing, and the read control means includes: a register reading select-signal generating circuit for generating a reading select signal for selectively reading the register in the reading-side register group in accordance with the address signal of the reading-side processor, and a reading-side selector circuit connected to each register in the reading-side register group and arranged to output, to the reading-side processor, data in the register in the reading-side register group selected in accordance with the reading select signal.

According to the another aspect of the present invention, there is provided a data interface having a structure where the write control means inhibits data transfer from the writing-side register to the reading-side register during a period in which the writing-side processor is reading a predetermined address space and causes data to automatically be transferred to the reading-side register group when reading of a predetermined address space has been completed.

According to the another aspect of the present invention, there is provided a data interface having a structure where the write control means includes: a register writing select-signal generating circuit for generating a writing select signal for selectively writing data on the register in the writing-side register group in accordance with the address signal and the write signal of the writing-side processor, a writing-side selector circuit provided for each register in the writing-side register group and arranged to normally select data obtained by feeding back data in the register in the writing-side register group and to select data in the writing-side processor to supply data to the register in the writing-side register group when selected in response to the writing select signal, a read-completion-signal generating circuit for generating a read completion signal for causing data to be collectively transferred from the writing-side register group to the reading-side register group when a predetermined address has been read in accordance with the address signal and the read signal of the reading-side processor, and a second writing-side selector circuit provided for each register in the reading-side register group and arranged to normally select data obtained by feeding back data in the register in the reading-side register group and to select data in the corresponding register in the writing-side register group to supply data to the register in the reading-side register group when the read completion signal indicates completion of reading, and the read control means includes: a register reading select-signal generating circuit for generating a reading select signal for selectively reading the register in the reading-side register group in accordance with the address signal of the reading-side processor, and a reading-side selector circuit connected to each register in the reading-side register group and arranged to output, to the reading-side processor, data in the register in the reading-side register group selected in accordance with the reading select signal.

According to the another aspect of the present invention, there is provided a data interface having a structure where the write control means inhibits data transfer from the writing-side register to the reading-side register during a period in which the writing-side processor is writing data and a period in which the reading-side processor is reading a predetermined address space and causes data to automatically be transferred to the reading-side register group when writing on a specific address has been performed or when reading of a predetermined address space has been completed.

According to the another aspect of the present invention, there is provided a data interface hating a structure where the write control means includes: a register writing select-signal generating circuit for generating a writing select signal for selectively writing data on the register in the writing-side register group in accordance with the address signal and the write signal of the writing-side processor, a writing-side selector circuit provided for each register in the writing-side register group and arranged to normally select data obtained by feeding back data in the register in the writing-side register group and to select data in the writing-side processor to supply data to the register in the writing-side register group when selected in response to the writing select signal, a write/read-completion-signal generating circuit for generating a write completion signal and a read completion signal for collectively transferring data from the writing-side register group to the reading-side register when writing on a predetermined address has been performed and when reading of a predetermined address has been performed in accordance with the address signal and the write signal of the writing-side processor and the address signal and the read signal of the reading-side processor, and a second writing-side selector circuit provided for each register in the reading-side register group and arranged to normally select data obtained by feeding back data in the register in the reading-side register group and to select data in the corresponding register in the writing-side register group to supply data to the register in the reading-side register group when the write completion signal and the read completion signal indicates completion of writing and reading, and the read control means includes: a register reading select-signal generating circuit for generating a reading select signal for selectively reading the register in the reading-side register group in accordance with the address signal of the reading-side processor, and a reading-side selector circuit connected to each register in the reading-side register group and arranged to output, to the reading-side processor, data in the register in the reading-side register group selected in accordance with the reading select signal.

According to the another aspect of the present invention, there is provided a high-speed communication system comprising a first processor, a dedicated high-speed-communication processor connected to the first processor, a second processor connected to the first processor through the dedicated high-speed-communication processor to transfer data to and from the first processor and data interfaces respectively provided between the first processor and the dedicated high-speed-communication processor and between the dedicated high-speed-communication processor and the second processor, wherein the data interface includes: a writing-side register group on which data of the processor of a data transmission side is written in response to a clock signal; a reading-side register group into which the data written into the writing-side register group is transferred and written in response to a later clock operation, the data being read out by a reading-side processor of a data receiving side; write control means for selectively writing data on a register in the writing-side register group in accordance with an address signal and a write signal of the processor of a data transmission side; and read control means for selectively reading data from a register in the reading-side register group in accordance with an address signal of the processor of a data receiving side.

BRIEF DESCRIPTION DRAWINGS

BEST MODE FOR CARRYING OUT THE INVENTION

Figure 1:
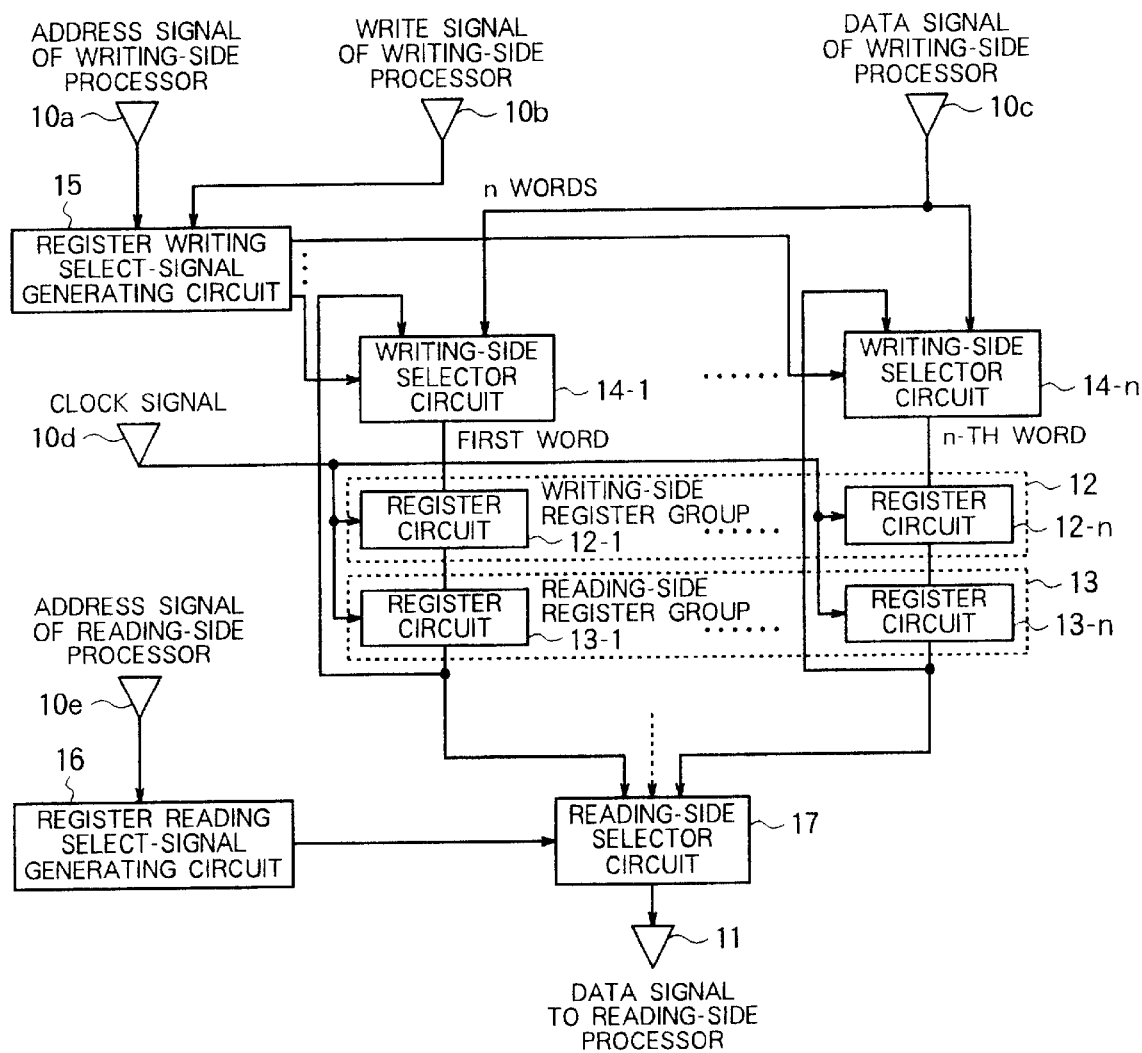
FIG. 1 is a block diagram showing the structure of an interface according to an embodiment of the present invention.

Embodiments of a data interface according to the present invention and a high-speed communication system using the data interface will now be described. In the drawings showing the embodiments, identical or similar elements are given the same reference numerals.

First Embodiment

FIG. 1 is a diagram showing the structure of a data interface according to an embodiment of the present invention.

The data interface according to this embodiment is provided between a control-side processor for directly issuing a command to, for example, an elevator group which is an object which must be controlled in a system for administrating an elevator group and a central processor for issuing a command to one or a plurality of the control-side processors in accordance with information input from a call button on each floor or a destination instruction button in an elevator car. A writing-side processor is a processor for transmitting data, while a reading-side processor is a processor for receiving data. In the above-mentioned system for administrating an elevator group, data to be transmitted is control information data.

Referring to FIG. 1, reference numerals 10a to 10e represent input-signal terminals. The terminals 10a to 10c respectively are supplied with address signals, write signals and data signals from the writing-side processor. The terminal 10d is supplied with a register writing clock signal, while the terminal 10e is supplied with an address signal of the reading-side processor. Reference numeral 11 represents an output-signal terminal from which a data signal is output to the reading-side processor.

Reference numeral 12 represents a writing-side register group composed of register circuits 12-1 to 12-n in which data is written from the writing-side processor, 13 represents a reading-side register group composed of register circuits 13-1 to 13-n from which data is read from the reading-side processor.

Reference numerals 14-1 to 14-n represent writing-side selector circuits provided for respective register circuits and arranged to select either data signals supplied from the writing-side processors or data fed back from the corresponding register circuits 13-1 to 13-n to supply selected data to the writing-side register circuits 12-1 to 12-n respectively.

Reference numeral 15 represents a register writing select-signal generating circuit which generates a register writing select-signal for writing to a corresponding register circuit among the register circuits 12-1 to 12-n in response to an address signal 10a and a write signal 10b of the writing-side processor.

The register circuits 12-1 to 12-n and 13-1 to 13-n and the selector circuits 14-1 to 14-n are provided in parallel in the same number corresponding to the number (n) of words which must be written as the data items.

Reference numeral 16 represents a register reading select-signal generating circuit which generates a register reading select-signal for selecting the data signal, which must be output to the reading-side processor, from corresponding register circuit among the register circuits 13-1 to 13-n in response to an address signal 10e of the reading-side processor. Reference numeral 17 represents a reading-side selector circuit which follows the reading select signal to output the data signal of the selected reading-side register circuit to a data bus of the reading-side processor.

Note that the writing-side selector circuits 14-1 to 14-n and the register writing select-signal generating circuit 15 form a write control means, while the register reading select-signal generating circuit 16 and the reading-side selector circuit 17 form a read control means.

The operation will now be described. A normal operation is performed as follows: when the address signal and the write signal output from the writing-side processor have been brought to a significant state, the register writing select-signal generating circuit 15 generates the select signals to control the selector circuits 14-1 to 14-n so as to cause the data signal 10c in the data bus of the writing-side processor to sequentially be written on the writing-side register circuits 12-1 to 12-n. If the selector circuit 14-1 has been selected in response to the select signal, the data signal 10c of the writing-side processor is written on the register circuit 12-1 through the selector circuit 14-1 in response to a clock signal 10d. In the next clock operation, the contents of the writing-side register circuit 12-1 are transferred and written on the corresponding reading-side register circuit 13-1 connected to the register circuit 12-1.

When the writing operation has been completed and the writing-side write signal 10b has been brought to a non-significant state (a state in which no writing operation is indicated), the register writing select-signal generating circuit 15 generates select signals for feeding back the data signals stored in the corresponding register circuits 13-1 to 13-n corresponding to the writing-side selector circuits 14-1 to 14-n respectively to the writing-side register circuits 12-1 to 12-n to maintain the contents of the register circuits.

When an address signal 10e of the reading-side processor has been supplied to the register reading select-signal generating circuit 16, a register reading select signal is generated to the reading-side selector circuit 17. The selector circuit 17 follows the select signal to output the value of the corresponding reading-side register circuit 13 to the reading-side processor as the data signal.

Since a double buffer structure is formed in which the writing-side register circuits 12-1 to 12-n and the reading-side registers 13-1 to 13-n are individually provided, the address signal and the data signal are individually connected to the writing-side and the reading-side. Thus, data transfer can be performed without interference between the processors.

Second Embodiment

Figure 2:
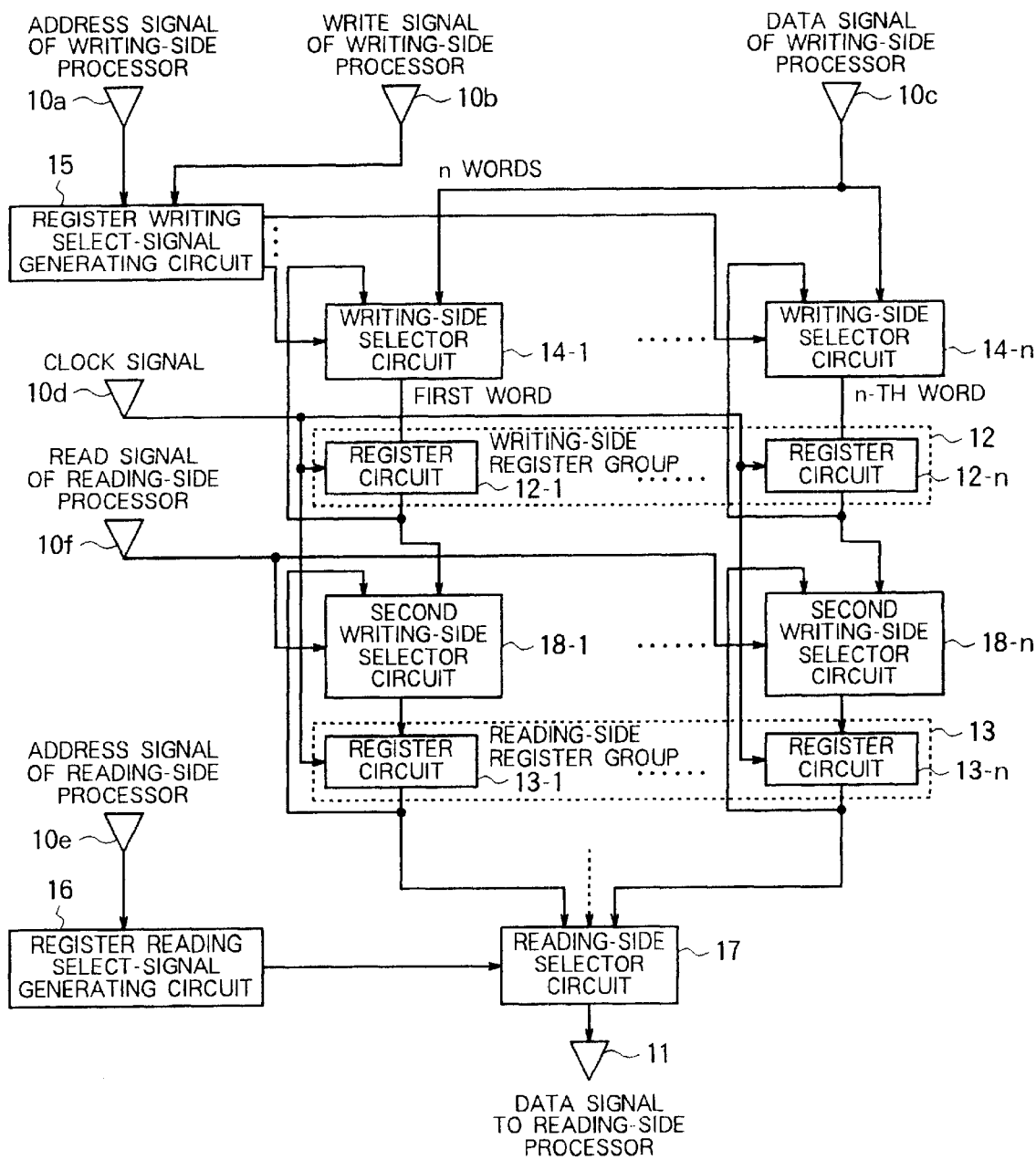
FIG. 2 is a block diagram showing the structure of an interface according to another embodiment of the present invention.

FIG. 2 is a diagram showing the structure of a data interface according to another embodiment of the present invention. In this embodiment, the writing operation and the reading operation are made to be independent from each other to improve reliability by employing a structure in which the value of the writing-side register group 12 is not automatically transferred to the reading-side register circuit 13 when the reading-side processor is performing a reading operation even after the writing-side processor has immediately completed the writing operation. The value of the writing-side register group 12 is automatically transferred to the reading-side register 13 after the reading operation has been completed.

Referring to FIG. 2, second writing-side selector circuits 18-1 to 18-n respectively provided for the registers 13-1 to 13-n of the reading-side register group 13 follow the read signal of the reading-side processor supplied from an input signal terminal 10f to select either data from the corresponding and connected register circuit in the writing-side register circuit group 12 or data obtained by feeding back data in the reading-side register group 13 to supply the selected data item to the reading-side register circuits 13-1 to 13-n.

Note that the writing-side selector circuits 14-1 to 14-n, the register writing select-signal generating circuit 15 and the second reading-side selector circuits 18-1 to 18-n form the write control means, while the register reading select-signal generating circuit 16 and the reading-side selector circuit 17 form the read control means.

The state of the selector circuit 18 is normally selected such that data of the corresponding register circuit 12, to which the reading side is connected, is written on the selector circuit 18 as a result of a clock synchronizing operation immediately after the writing-side register 12 has been written. When the reading-side processor starts the reading operation and the read signal 10f is brought to a significant state (indicating a read operation state), the selector circuit 18 feeds back the data value in the reading-side register circuit 13 to maintain the present value. When the read signal 10f is brought to a non-significant state (indicating no reading operation), the selector circuit 18 is returned to a normal state so that a state is realized in which data from the writing-side register circuit 12 is selected. In response to the next clock synchronizing signal, the value of the writing-side register circuit 12 is automatically transferred to the reading-side register circuit 13.

As a result, data transfer can be performed in such a manner that the reading operation of the reading-side processor is not affected by the writing operation of the writing-side processor.

Third Embodiment

Figure 3:
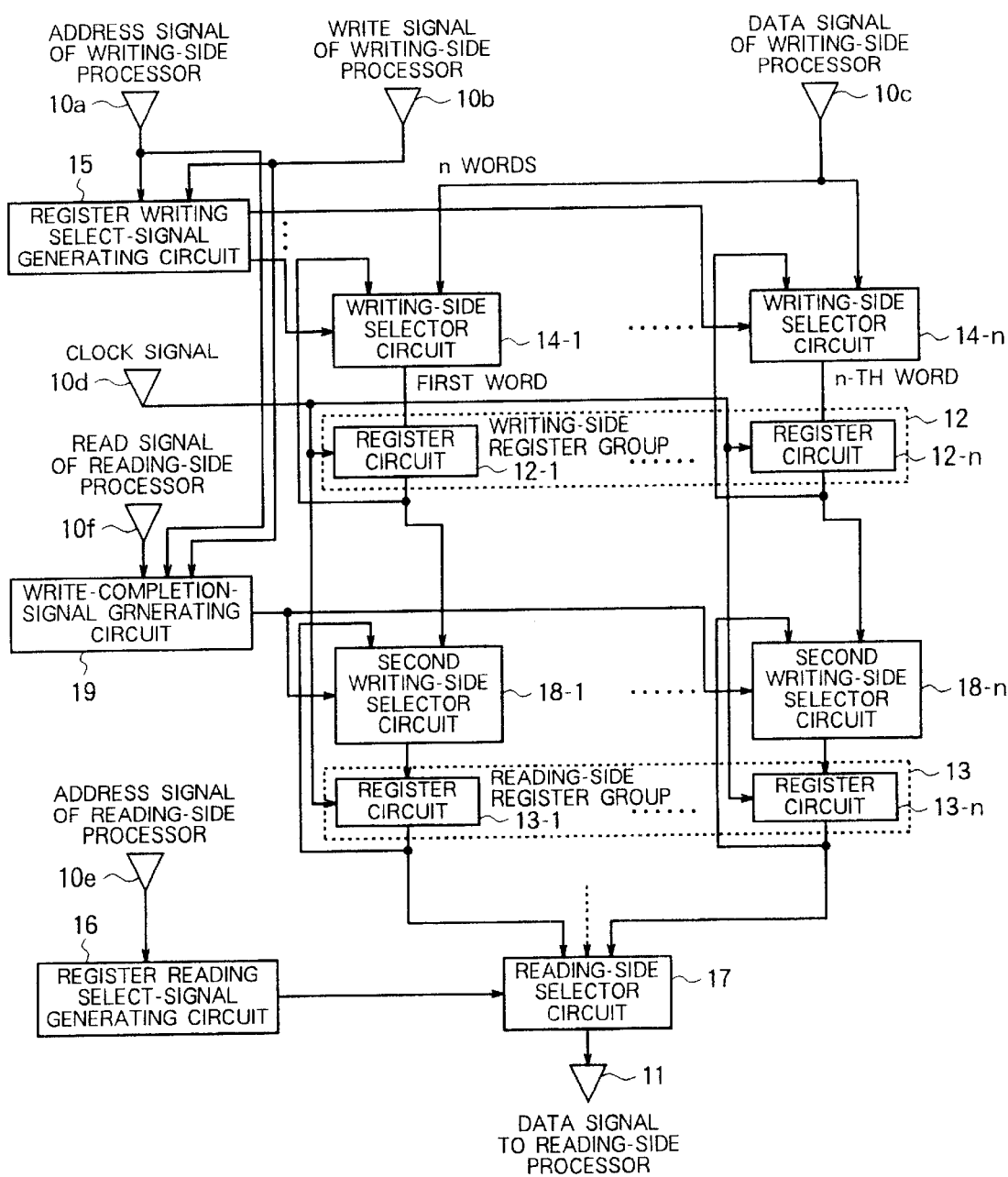
FIG. 3 is a block diagram showing the structure of an interface according to another embodiment of the present invention.

FIG. 3 is a diagram showing the structure of the data interface according to another embodiment of the present invention. In this embodiment, data is collectively transferred from the writing-side register circuit 12 to the reading-side register circuit 13 when all the writing operations from the writing-side processor have been completed.

Referring to FIG. 3, a write-completion-signal generating circuit 19 is provided which generates a select signal to be supplied to each of the second writing-side selector circuits 18-1 to 18-n for determining input to the register circuits 13-1 to 13-n.

The writing-side selector circuits 14-1 to 14-n, the register writing select-signal generating circuit 15, the second writing-side selector circuits 18-1 to 18-n and the write-completion-signal generating circuit 19 form the write control means, while the register reading select-signal generating circuit 16 and the reading-side selector circuit 17 form the read control means.

Although the second embodiment has the structure in which the select signal is generated in response to the read signal of the reading-side processor, this embodiment has a structure that the address signal 10a and the write signal 10b of the writing-side processor are used as the data transfer condition to the reading-side register circuit 13. The write-completion-signal generating circuit 19 generates write completion signal for permitting data transfer from the writing-side register circuit 12 to each of the corresponding reading-side register circuit 13 in a writing operation on a specific address of the writing-side processor. That is, after the writing-side processor has completed writing on all of the writing-side register circuits 12, writing to a certain address is performed so that collective data transfer from all of the writing-side register circuits 12-1 to 12-n to the reading-side register circuits 13-1 to 13-n is enabled.

As shown in FIG. 3, the read signal 10f of the reading-side processor according to the second embodiment may be added to the condition under which the completion signal is generated by the write-completion-signal generating circuit 19. In this case, a state where the reading-side processor is not performing a reading operation is employed as an additional condition for generating the write completion signal.

Fourth Embodiment

Figure 4:
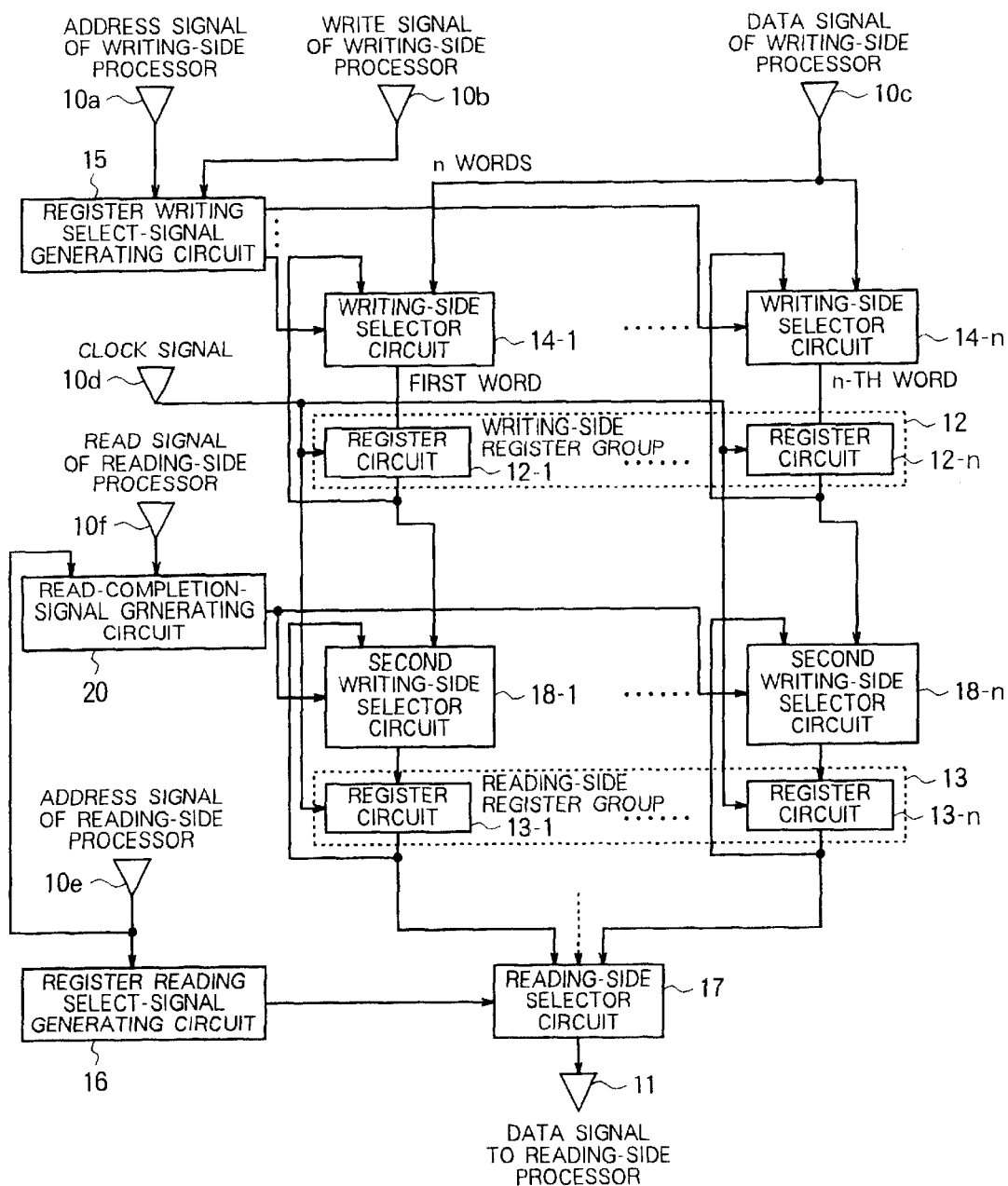
FIG. 4 is a block diagram showing the structure of an interface according to another embodiment of the present invention.

FIG. 4 is a diagram showing the structure of a data interface according to another embodiment of the present invention. In this embodiment, when data is required to be read to the reading-side processor in such a manner that a sequential data items having conformability or unity are read, automatic transfer of data from the writing-side register circuit 12 to the reading-side register circuit 13 is not performed in consideration of time lapse and the like during a period (cycle) in which the reading-side processor is reading a certain address space.

In the structure shown in FIG. 4, a read-completion-signal generating circuit 20 is provided which generates a select signal to the second writing-side selector circuits 18-1 to 18-n which determines input to the reading-side register circuits 13-1 to 13-n respectively. The address signal 10e and the read signal 10f of the reading-side processor are used as the conditions under which data can be transferred to the reading-side register circuit 13.

Note that the writing-side selector circuits 14-1 to 14-n, the register writing select-signal generating circuit 15, the second writing-side selector circuits 18-1 to 18-n and the read-completion-signal generating circuit 20 form the write control means, while the register reading select-signal generating circuit 16 and the reading-side selector circuit 17 form the read control means.

As a result, data is not transferred from the writing-side register circuit 12 to the reading-side register circuit 13 until the reading-side processor completes reading of a certain space. Thus, sequential data items read in a certain address area are unified in terms of time and the data items above can be viewed as reliable data items having conformability.

Fifth Embodiment

Figure 5:
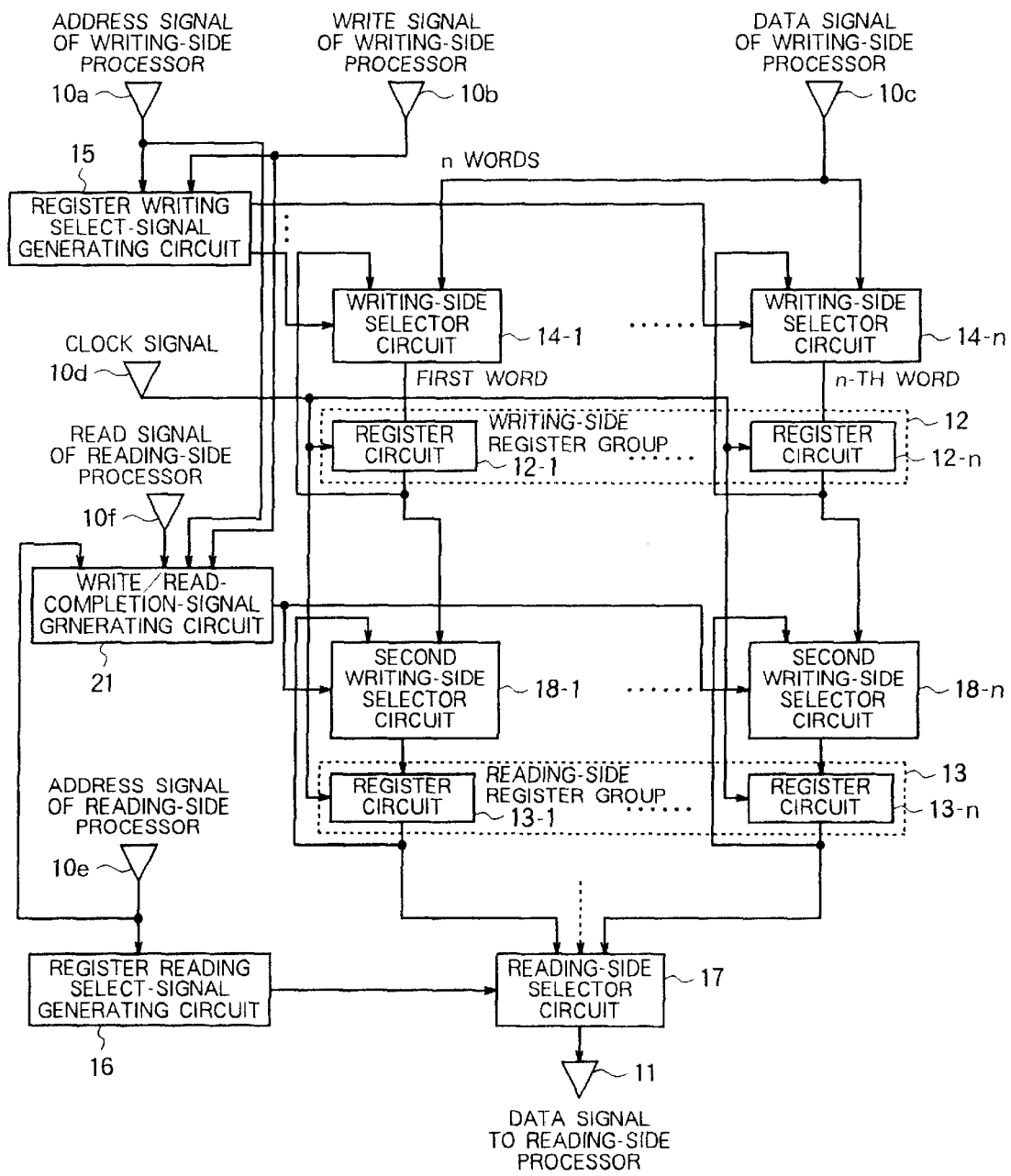
FIG. 5 is a block diagram showing the structure of an interface according to another embodiment of the present invention.

FIG. 5 is a diagram showing the structure of the data interface according to another embodiment of the present invention. This embodiment has a structure formed by combining the functions of the second, third and fourth embodiments so that data transfer is collectively performed from the writing-side register circuit 12 to the reading-side register circuit 13 when writing from the writing-side processor has been completed. Moreover, in a period in which the reading-side processor is reading a certain address area, automatic transfer of data from the writing-side register circuit 12 to the reading-side register circuit 13 is inhibited.

Referring to FIG. 5, a write/read-completion-signal generating circuit 21 is provided which generates a select signal for each of the second writing-side selector circuits 18-1 to 18-n for determining input to the reading-side register circuits 13-1 to 13-n. The address signal 10a and the write signal 10b of the writing-side processor and the address signal 10e and the read signal 10f of the reading-side processor are employed as conditions under which data is transferred to the reading-side register circuit 13.

Note that the writing-side selector circuits 14-1 to 14-n, the register writing select-signal generating circuit 15, the second writing-side selector circuits 18-1 to 18-n and the write/read-completion-signal generating circuit 21 form the write control means, while the register reading select-signal generating circuit 16 and the reading-side selector circuit 17 form the read control means.

As a result, after the writing-side processor has written data on all of the register circuits 12, it writes data on a specific address so that collective data transfer from all of the writing-side register circuits 12-1 to 12-n to the reading-side register circuits 13-1 to 13-n is enabled. Moreover, data is not transferred from the writing-side register circuit 12 to the reading-side register circuit 13 until the reading-side processor completes reading of a certain space. Thus, sequential data items read in a certain address area are unified in terms of time and the data items above are reliable data items having conformability.

Sixth Embodiment

Figure 6:
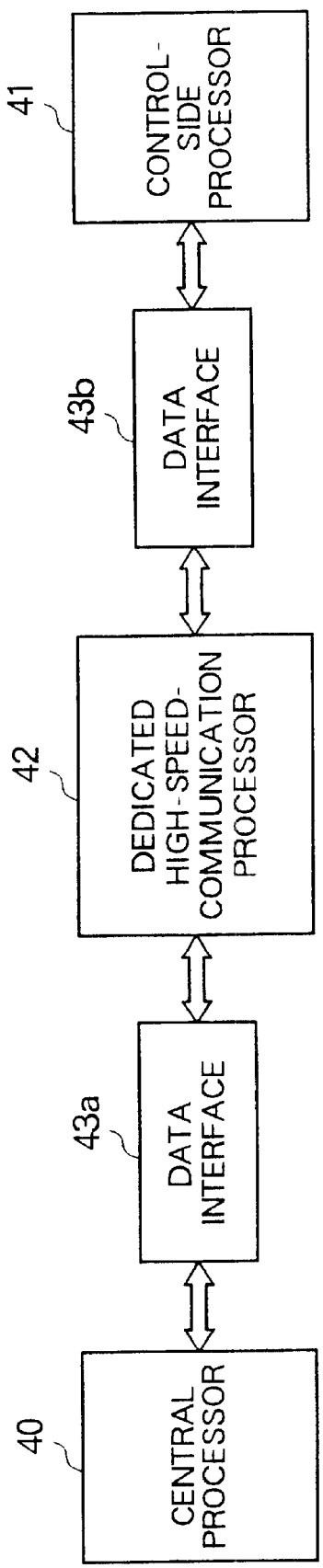
FIG. 6 is a block diagram showing the structure of a high-speed-communication system according to another embodiment of the present invention.

FIG. 6 is a diagram showing the structure of a high-speed-communication system according to another embodiment of the present invention. Referring to FIG. 6, reference numeral 40 represents a central processor, which is a first processor, 41 represents a control-side processor which is a second processor, 42 represents an dedicated high-speed-communication processor for establishing the connection between the central processor 40 and the control-side processor 41, and 43a and 43b represent the data interfaces according to the foregoing embodiments and respectively connected between the central processor 40 and the dedicated high-speed-communication processor 42 and between the dedicated high-speed-communication processor 42 and the central processor 41.

When data transfer is performed between the central processor 40 and the dedicated high-speed-communication processor 42 and between the dedicated high-speed-communication processor 42 and the control-side processor 41, the processor which transmits data acts as a writing-side processor. On the other hand, the processor which receives data acts as the reading-side processor. Thus, the data interfaces 43a and 43b attain the effects described in the foregoing embodiments.

INDUSTRIAL APPLICABILITY

As described above, according to the present invention, the data interface for communicating data between processors, comprises a writing-side register group on which data in a writing-side processor of a data transmitting side is written in response to a clock signal; a reading-side register group into which the data written into the writing-side register group is transferred and written in response to a later clock operation, the data being read out by a reading-side processor of a data receiving side; write control means for selectively writing data on a register in the writing-side register group in accordance with an address signal and a write signal of the writing-side processor; and read control means for selectively reading data from a register in the reading-side register group in accordance with an address signal of the reading-side processor. Thus, the double buffer structure including of the writing side registers and the reading side registers is formed. Therefore, the address signal and the data signal are individually connected in the writing side and the reading side. As a result, the respective processors are able to transfer data without mutual interference.

Further the present invention is arranged in such a manner that the write control means inhibits data transfer from the writing-side register group to the reading-side register group during a period in which the reading-side processor is reading data and causes data to automatically be transferred after reading has been completed. Therefore, the reading operation, which is conducted by the reading-side processor, can be performed without influence from the writing operation which is performed by the writing-side processor. As a result, reliability in the data transfer can be improved.

Further the present invention is arranged in such a manner that the write control means inhibits data transfer from the writing-side register group to the reading-side register group during a period in which the writing-side processor performs writing and causes data to be collectively transferred to the reading-side register group when writing on a specific address has been performed. Therefore, when writing of a series of the registers from the writing-side processor has been completed, data can collectively be transferred to the reading-side register.

Further more, the present invention is arranged in such a manner that the write control means inhibits data transfer from the writing-side register to the reading-side register during a period in which the writing-side processor is reading a predetermined address space and causes data to automatically be transferred to the reading-side register group when reading of a predetermined address space has been completed. Therefore, data is not transferred from the writing-side register to the reading-side register during a period in which the reading-side processor is reading a certain address area. Therefore, the address area in the reading-side processor can always be read as sequential data items having conformability or unity.

Further more, the present invention is arranged in such a manner that the write control means inhibits data transfer from the writing-side register to the reading-side register during a period in which the writing-side processor is writing data and a period in which the reading-side processor is reading a predetermined address space and causes data to automatically be transferred to the reading-side register group when writing on a specific address has been performed or when reading of a predetermined address space has been completed. Therefore, when writing on sequential registers from the writing-side processor has been completed, data can collectively be transferred to the reading-side registers. Moreover, data is not transferred from the writing-side register to the reading-side register during a period in which the reading-side processor is reading a certain address space. Therefore, the address area in the reading-side processor can always be read as sequential data items having conformability or unity.

Further more, the high speed communication system according to the present invention comprises the first processor, a dedicated high-speed-communication processor connected to the first processor, a second processor connected to the first processor through the dedicated high-speed-communication processor to transfer data to and from the first processor, and data interfaces respectively provided between the first processor and the dedicated high-speed-communication processor and between the dedicated high-speed-communication processor and the second processor, wherein the data interface includes a writing-side register group on which data of the processor of a data transmission side is written in response to a clock signal, a reading-side register group into which the data written into the writing-side register group is transferred and written in response to a later clock operation, the data being read out by a reading-side processor of a data receiving side, write control means for selectively writing data on a register in the writing-side register group in accordance with an address signal and a write signal of the processor in a data-transmitting-side, and read control means for selectively reading data from a register in the reading-side register group in accordance with an address signal of the processor in a data-receiving-side. Therefore, even if the dedicated high-speed-communication processor is provided between the writing-side processor and the reading-side processor, high-speed data transfer, which is free from mutual interference and which does not affect the respective calculating processes, can be performed between the writing-side processor and the dedicated high-speed-communication processor and between the dedicated high-speed-communication processor and the reading-side processor.

What is claimed is:

1. A data interface for communicating data between processors, comprising:
   a writing-side register group in which data in a writing-side processor of a data transmitting side is written in response to a clock signal;
   a reading-side register group into which the data written into said writing-side register group is transferred and written in response to a later clock operation, the data being read out by a reading-side processor of a data receiving side;
   write control means for selectively writing data in a register in said writing-side register group in accordance with an address signal and a write signal of said writing-side processor; and
   read control means for selectively reading data from a register in said reading-side register group in accordance with an address signal of said reading-side processor.

2. The data interface according to claim 1, wherein said write control means includes:
   a register writing select-signal generating circuit for generating a writing select signal for selectively writing data in the register in said writing-side register group in accordance with the address signal and the write signal of said writing-side processor, and
   a writing-side selector circuit for each register in said writing-side register group and arranged to select data obtained by feeding back data in the corresponding register in said reading-side register group and to select data in said writing-side processor to supply data to the register in said writing-side register group when selected in response to the writing select signal, and
said read control means includes:
   a register reading select-signal generating circuit for generating a reading select signal for selectively reading the register in said reading-side register group in accordance with the address signal of said reading-side processor, and
   a reading-side selector circuit connected to each register in said reading-side register group and arranged to output, to said reading-side processor, data in the register in said reading-side register group selected in accordance with the reading select signal.

3. The data interface according to claim 1, wherein said write control means inhibits data transfer from said writing-side register group to said reading-side register group during a period in which said reading-side processor is reading data and causes data to automatically be transferred after reading has been completed.

4. The data interface according to claim 3, wherein:
said write control means includes:
   a register writing select-signal generating circuit for generating a writing select signal for selectively writing data on the register in said writing-side register group in accordance with the address signal and the write signal of said writing-side processor,
   a writing-side selector circuit for each register in said writing-side register group and arranged to select data obtained by feeding back data in the register in said writing-side register group and to select data in said writing-side processor to supply data to the register in said writing-side register group when selected in response to the writing select signal, and
   a second writing-side selector circuit for each register in said reading-side register group and arranged to select data in the corresponding register in said writing-side register group and to select data obtained by feeding back data in the register in said reading-side register group to supply data to the register in said reading-side register group when the read signal of said reading-side processor is in a read state, and
said read control means includes:
   register reading select-signal generating circuit for generating a reading select signal for selectively reading the register in said reading-side register group in accordance with the address of said reading-side processor, and a reading-side selector circuit connected to each register in said reading-side register group and arranged to output, to said reading-side processor, data in the register in said reading-side register group selected in accordance with the reading select signal.

5. The data interface according to claim 1, wherein said write control means inhibits data transfer from said writing-side register group to said reading-side register group during a period in which said writing-side processor writes data and causes data to be collectively transferred to said reading-side register group when writing at a specific address has been performed.

6. The data interface according to claim 5, wherein:
said write control means includes:
   a register writing select-signal generating circuit for generating a writing select signal for selectively writing data on the register in said writing-side register group in accordance with the address signal and the write signal of said writing-side processor,
   a writing-side selector circuit for each register in said writing-side register group and arranged to select data obtained by feeding back data in the register in said writing-side register group and to select data in said writing-side processor to supply data to the register in said writing-side register group when selected in response to the writing select signal,
   a write-completion-signal generating circuit for generating a write completion signal for causing data to be collectively transferred from said writing-side register group to said reading-side register when writing in a specific address has been performed in accordance with the address signal and the write signal of said writing-side processor, and
   a second writing-side selector circuit for each register in said reading-side register group and arranged to select data obtained by feeding back data in the register in said reading-side register group and to select data in the corresponding register in said writing-side register group to supply data to the register in said reading-side register group when said write completion signal indicates completion of writing, and
said read control means includes:
   a register reading select-signal generating circuit for generating a reading select signal for selectively reading the register in said reading-side register group in accordance with the address signal of said reading-side processor, and
   a reading-side selector circuit connected to each register in said reading-side register group and arranged to output, to said reading-side processor, data in the register in said reading-side register group selected in accordance with the reading select signal.

7. The data interface according to claim 1, wherein said write control means inhibits data transfer from said writing-side register to said reading-side register during a period in which said writing-side processor is reading a specific address space and causes data to automatically be transferred to said reading-side register group when reading of the specific address space has been completed.

8. The data interface according to claim 7, wherein:
said write control means includes:
   a register writing select-signal generating circuit for generating a writing select signal for selectively writing data in the register in said writing-side register group in accordance with the address signal and the write signal of said writing-side processor,
   a writing-side selector circuit for each register in said writing-side register group and arranged to select data obtained by feeding back data in the register in said writing-side register group and to select data in said writing-side processor to supply data to the register in said writing-side register group when selected in response to the writing select signal,
   a read-completion-signal generating circuit for generating a read completion signal for causing data to be collectively transferred from said writing-side register group to said reading-side register group when a predetermined address has been read in accordance with the address signal and the read signal of said reading-side processor, and
   a second writing-side selector circuit for each register in said reading-side register group and arranged to select data obtained by feeding back data in the register in said reading-side register group and to select data in the corresponding register in said writing-side register group to supply data to the register in said reading-side register group when said read completion signal indicates completion of reading, and
said read control means includes:
   a register reading select-signal generating circuit for generating a, reading select signal for selectively reading the register in said reading-side register group in accordance with the address signal of said reading-side processor, and
   a reading-side selector circuit connected to each register in said reading-side register group and arranged to output, to said reading-side processor, data in the register in said reading-side register group selected in accordance with the reading select signal.

9. The data interface according to claim 1, wherein said write control means inhibits data transfer from said writing-side register to said reading-side register during a period in which said writing-side processor is writing data and a period in which said reading-side processor is reading a specified address space and causes data to automatically be transferred to said reading-side register group when writing in a specific address has been performed or when reading of the specific address space has been completed.

10. The data interface according to claim 9, wherein:
said write control means includes:
   a register writing select-signal generating circuit for generating a writing select signal for selectively writing data in the register in said writing-side register group in accordance with the address signal and the write signal of said writing-side processor,
   a writing-side selector circuit for each register in said writing-side register group and arranged to select data obtained by feeding back data in the register in said writing-side register group and to select data in said writing-side processor to supply data to the register in said writing-side register group when selected in response to the writing select signal,
   a write/read-completion-signal generating circuit for generating a write completion signal and a read completion signal for collectively transferring data from said writing-side register group to said reading-side register when writing in a specific address has been performed and when reading of the specific address has been performed in accordance with the address signal and the write signal of said writing-side processor and the address signal and the read signal of said reading-side processor, and a second writing-side selector circuit for each register in said reading-side register group and arranged to select data obtained by feeding back data in the register in said reading-side register group and to select data in the corresponding register in said writing-side register group to supply data to the register in said reading-side register group when said write completion signal and said read completion signal indicates completion of writing and reading, and said read control means includes:
    a register reading select-signal generating circuit for generating a reading select signal for selectively reading the register in said reading-side register group in accordance with the address signal of said reading-side processor, and
    a reading-side selector circuit connected to each register in said reading-side register group and arranged to output, to said reading-side processor, data in the register in said reading-side register group selected in accordance with the reading select signal.

11. A high-speed communication system comprising a first processor, a dedicated high-speed-communication processor, connected to said first processor, a second processor connected to said first processor through said dedicated high-speed-communication processor to transfer data to and from said first processor, and data interfaces respectively provided between said first processor and said dedicated high-speed-communication processor and between said dedicated high-speed-communication processor and said second processor, wherein each of said data interfaces includes:

a writing-side register group in which data of said processor of a data transmission side is written in response to a clock signal;

a reading-side register group into which the data written into said writing-side register group is transferred and written in response to a later clock operation, the data being read out by a reading-side processor of a data receiving side;

write control means for selectively writing data in a register in said writing-side register group in accordance with an address signal and a write signal of the processor in a data-transmitting-side; and read control means for selectively reading data from a register in said reading-side register group in accordance with an-address signal of the processor in a data-receiving-side.

* * * * *